Figure 1:
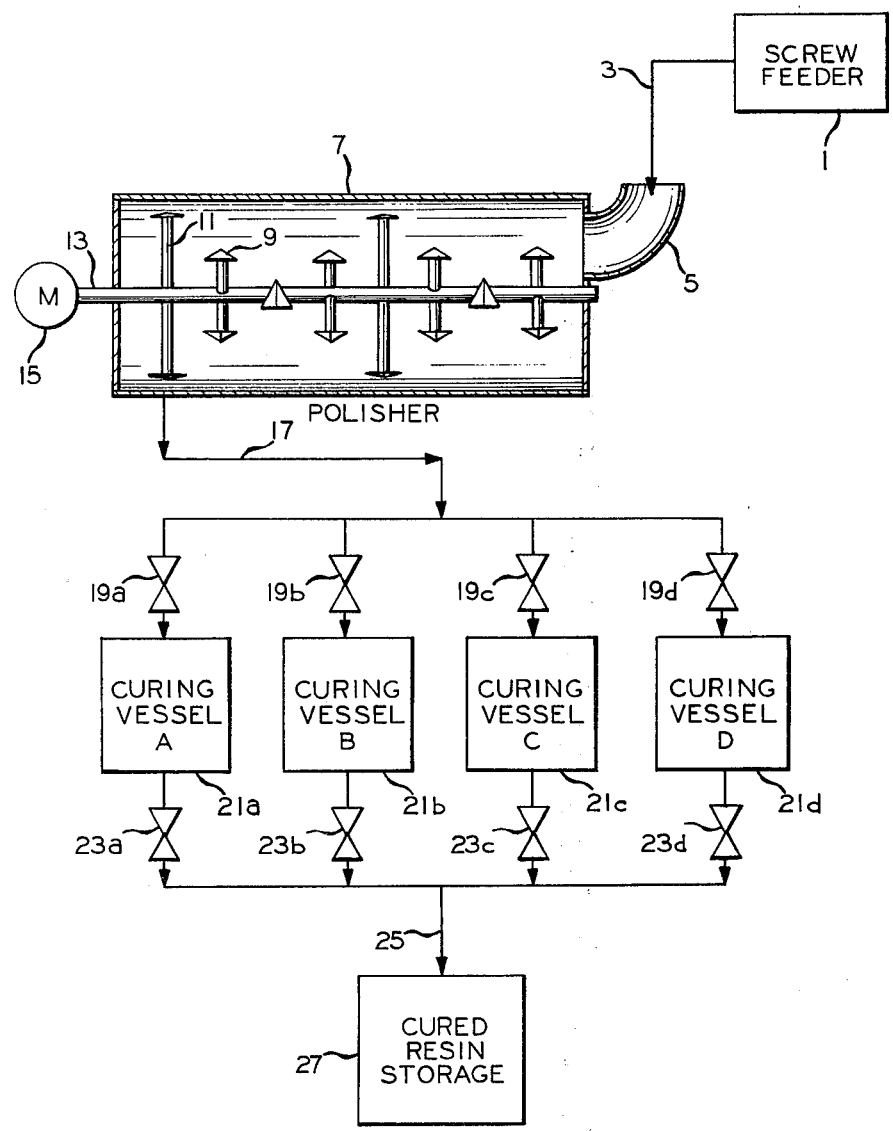

United States Patent [19]

Salmon

[11] 4,370,471

[45] Jan. 25, 1983

[54] HEAT CURING ARYLENE SULFIDE POLYMER

[75] Inventor: Emigdio J. Salmon, Bartlesville, Okla.

[73] Assignee: Phillips Petroleum Company, Bartlesville, Okla.

[21] Appl. No.: 260,960

[22] Filed: May 6, 1981

[51] Int. Cl.$^3$ ............................................ C08G 75/14
[52] U.S. Cl. .................................................. 528/388
[58] Field of Search ........................................ 528/388

[56] References Cited

U.S. PATENT DOCUMENTS

| | | |
|---|---|---|
| 3,229,022 | 1/1966 | Feder . |
| 3,472,491 | 10/1969 | Feder . |
| 3,524,835 | 8/1970 | Edmonds, Jr. et al. . |
| 3,717,620 | 2/1973 | Rohlfing . |
| 3,793,256 | 2/1974 | Scoggin . |
| 4,025,480 | 5/1977 | Larsen . |

Primary Examiner—Melvyn I. Marquis

[57] ABSTRACT

A method for curing particulate arylene sulfide polymer in which the particulate polymer is preheated from ambient temperature to a skin temperature within the range of about 230° to about 260° C. by agitating the particulate polymer in a polisher apparatus, transferring the preheated particles to a curing vessel, and further heating the preheated particulate polymer in the curing vessel for a time and at a temperature to produce cured polymer having a pre-selected melt flow range. Preferably, preheating is carried out continuously with the heated polymer delivered to alternative curing vessels wherein the curing is carried out batch wise.

6 Claims, 1 Drawing Figure

HEAT CURING ARYLENE SULFIDE POLYMER

BACKGROUND OF THE INVENTION

This invention relates to the curing of particulate arylene sulfide polymer. In one of its aspects it relates to a two-step process for curing particulate arylene sulfide polymer. In another of its aspects it relates to the use of a polisher apparatus in the curing of the particulate arylene sulfide polymers.

Conventionally, the curing cycle for arylene sulfide polymer is carried out in a single vessel. This entails filling the vessel with uncured polymer, bringing the entire mass to curing temperature (heat-up time) and continuing the heating until the desired melt flow of the batch is obtained (curing time). In a commercial operation where tons of polymer are cured in a batch process a sizeable length of time is spent in just reaching the curing temperature, e.g. about 15-20 hours. After the curing temperature is reached an additional 20-50 hours can be used in curing the resin to the desired level. The instant invention resides in reducing the heatup time by interposing a preheating step on the process as described below. By largely eliminating the 15-20 hours heatup time in the curing vessel, the overall length of the curing cycle is reduced proportionally and a substantial increase in the overall curing capacity of the combined system is effected and compared to use of a curing vessel alone.

It is therefore an object of this invention to provide a method for curing arylene sulfide polymer in which the overall time associated with curing the polymer in a single vessel is reduced. It is another object of this invention to provide a two-step process for curing arylene sulfide polymer in which the first step advantageously uses the friction developed in a mechanical device for heating the polymer from ambient to curing temperature. It is another object of the invention to provide a method for curing arylene sulfide polymer in which the heating of the polymer from ambient temperature to curing temperature can be carried out on a continuous basis with the curing process then applied batch wise.

Other aspects, objects and the various advantages of this invention will become apparent upon studying this disclosure, the drawings, and the appended claims.

STATEMENT OF THE INVENTION

According to this invention a method is provided for curing particulate arylene sulfide polymer in which the particulate polymer is first preheated from ambient temperature to a skin temperature within the range of about 230° to about 260° C. utilizing the frictional heat developed by agitation of the particulate polymer in a polisher apparatus and then transferring the preheated particles to a curing vessel in which a second operation of further heating the preheated particulate polymer for a time and at a temperature to produce cured polymer having a pre-selected melt flow range is carried out.

Preferably, the preheating of the particulate polymer is carried out continuously with the heated polymer delivered to alternative curing vessels wherein the curing is carried out batch wise.

The arylene sulfide polymers are known polymers which are disclosed in U.S. Pat. No. 3,354,129 which issued Nov. 21, 1967 to J. T. Edmonds, Jr. and H. W. Hill, Jr. Polymers which are preferably employed in the instant invention have melting points which can range from about 200° C. to about 500° C. Most preferably the polymers are phenylene sulfide polymers (PPS) which have melting points ranging from about 290° C. to about 480° C. The phenylene sulfide polymers as prepared are finely divided resins which have melt flows generally ranging from about 4,000 to about 8,000 or more as determined according to ASTM D 1238 at 600° F. (316° C.) using a 5 kg weight. Since injection molding and extrusion applications are more feasible when the resin melt flow is reduced to about 500 or less, e.g. within a range of about 5 to about 250, this invention provides the means to convert high melt flow resin to low melt flow commerically attractive resin as efficiently and as conveniently as possible.

The process comprises a first step of preheating particulate resin which is at ambient temperature, e.g. 25° C. up to or near the temperature employed in a subsequent curing step, e.g. 260° C. skin temperature, by utilizing the frictional heat developed by agitation of the polymer particles as they pass through the polisher apparatus. A polisher suitable for use in this process is described in detail in U.S. Pat. No. 3,229,022 which issued Jan. 11, 1966 to F. R. Feder herein incorporated by reference. The polymer particles are continuously fed at ambient temperature to the polisher and the heated product continuously fed to the heat vessel employed in the curing step. The preheating operation is conducted until the vessel employed in the curing step is filled. At that time, the feeding operation can be discontinued or the polisher can be operated to charge one or more alternative curing vessels.

As described in U.S. Pat. No. 3,229,002 a typical polisher apparatus is a hollow cylindrical vessel disposed on a horizontal axis. The vessel contains stirrers which are in the form of cross bars which are mounted on a concentric, horizontal shaft. Optionally, the cross bars can have plow head mounted thereon. Each cross bar or plow head is mounted so that it is spaced from the inside wall of the blender at a short distance from the wall, i.e. about ⅛ of an inch. The cross bars are spaced axially along the vessel with the axial dimensions of the plow heads when used, designed so that there is a small overlap in the paths of the adjacent plow heads. The cross bars are placed at an angle in relation to each other to provide a uniform array of cross bars in the blender. There is an inlet at one end of the blender and an outlet at the other end. The outlet is provided with a valve in the form of a movable plate which is positioned to control the flow of material to the blender. The shaft is driven by a motor. At each end of the vessel, a scraper is mounted on the shaft. These scrapers serve to insure against accumulation of material as a cake at the ends of the blender. Such devices are well known.

The process comprises a second (curing) step of heating the agitated contents of the curing vessel for a time sufficient to effect the desired amount of cure. Samples for melt flow measurement are taken from the vessel periodically until the desired, preselected melt flow range is reached. At that time heating of the vessel can be discontinued and cooling of the vessel can be initiated to lower the temperature of the still agitated polymer particles to stop the curing process, e.g., from about 260° C. to about 66° C. or lower. At that time the cured polymer can be transferred to containers or bins where it is further cooled to room temperature, if desired, and then stored. In another embodiment, the cured polymer from the heated curing vessel is diverted to a cooling vessel or vessels where it is cooled as previously described. As soon as the heated curing vessel is emptied another batch of preheated polymer from the polisher of the heat up step is charged to it and the cycle is repeated.

In the heat-up step, the polisher is operated at conditions selected to insure that melting or heat softening of the surface of the polymer particles to the point of stickiness does not occur and that the particles substantially retain their integrity at all times. In the heating of PPS, which can have a melting point in a range from about 290°–480° C. (555°–895° F.), the polisher operation is adjusted by manipulating polymer feed rate and/or rotor speed so that the maximum skin temperature of the polymer particles is in a range from about 230° C. to about 260° C. (445°–500° F.). As the heated polymer starts to exit the polisher, temperature equilibration of the particles continues as heat is transferred by conduction into particle interior. The bed temperature of the polymer particles at the discharge end of the polisher is lower than the maximum skin temperatures reached and can range from about 195° C. to about 220° C. (385°–430° F.).

In the curing step the agitated, preheated polymer is heated to a higher bed temperature which typically ranges from about 10° C. to about 100° C. (50°–212° F.) below the polymer melting point. With PPS, the curing bed temperature employed can range from about 180° C. to about 280° C. (355°–535° F.). The length of heating time is dependent upon the degree of cure desired and the temperature employed but generally ranges from about one minute to about 24 hours although a longer time can be used.

A general operation of the methods of this invention can best be understood in conjunction with the drawing which is a schematic illustration of the process.

Referring to the drawing, arylene sulfide polymer is placed in a feeder device such as screw feeder 1 and is passed by line 3 and entry line 5 into a polisher 7 which contains a series of plow heads 9 mounted on cross bars 11 attached to shaft 13 which is driven by motor 15, as described above. As the resin is continuously passed through the polisher the frictional energy of contact with the plow heads 9 acts to raise the temperature of the polymer as desired. The heated polymer is then passed through the downstream end of the polisher 7 through line 17 and a selectively opened valve 19a, b, c, d, into a curing vessel 21a, b, c, d. Usually, the continuous passage of polymer from the polisher 7 will be used to fill one curing vessel 21a until the desired amount of polymer is contained therein. At this time valve 19a will be closed and another entry valve 19b, for instance, will be opened to allow the filling of 21b. While alternative curing vessels are being filled the curing process can be carried out in an already filled vessel 21a by maintaining a curing temperature at the desired level for the desired time.

Upon completion of the curing cycle in vessel 21a the polymer can be allowed to cool to ambient temperature and then released through valve 23a and line 25 into cured resin storage vessel 27. In the event that a single melt flow range is being produced, cured polymer, as the batch process is being completed, can, similarly, be passed from the other curing vessels 21b, c, d through 23b, c, d and line 25 into the same cured resin storage vessel 27.

EXAMPLE 1

Preheating of PPS powder having a melt flow of 6500 was accomplished by passing 525 lbs (238 kg) of it in 75 minutes through a commercially available polisher apparatus comprising a chamber 14 inches (35.5 cm) in diameter and 21 inches (53.3 cm) in length with a shaft 2 inches (5.1 cm) in diameter down the center. Twelve rods attached radially to the shaft heated the polymer by the input of mechanical energy as the shaft was rotated at 1760 RPM by means of a 25 hp motor. Thermocouples located along the chamber and exit area allowed temperature measurements to be made. The solid, particulate, heated resin was discharged from the polisher through an auger and exit chute arrangement. The chute was equipped with a diverting means (flapper) so that small samples of the product could be periodically taken from melt flow determinations. The rate of polymer processed through the polisher amounted to 402 lbs/hr (190 kg/hr).

As the heated resin was discharged from the polisher it was charged to a preheated, jacketed, steel curing vessel. This charging took 75 minutes. In the vessel, which was equipped with a double spiral agitator the resin was contacted with air as a purging and curing medium. The agitator rotated at 58 RPM and 0.5 SCR/min air was injected. Heated oil circulating through the jacket provided the heat source for the curing vessel. Cooling means were also provided to lower the temperature of the oil at the conclusion of a run. At that time, nitrogen replaced air as the purging means until the temperature of the resin bed reached about 100°–150° F. (38°–66° C.). The cooled, cured resin was then discharged into drums for storage.

Times, temperatures, and resin melt flows during the run are shown in Table 1.

TABLE 1

| Vessel | Time (hours) | Bed Resin Temp., °C. | Resin Melt Flow, g/10 min |
|---|---|---|---|
| Polisher | 0 | 35 | 6500 |
|  | 0.2 | 234–242 | not determined |
|  | 0.5 | 199–202 | 4100 |
|  | 1.25 | 223 | 3500 |
| Curing | 0 | 223 | 3500 |
|  | 3.5 | 222 | 1809 |
|  | 5.5 | 218 | 309 |
|  | 14.7 | 197 | 254 |
|  | 18.3 | 199 | 256 |
|  | 25.5 | 200 | 196 |
|  | 29.0 | 199 | 180 |
|  | 32.0 | 199 | 161 |
|  | 36.0 | cooling started | 132 |
|  | 38.5 | ca 38 | 138 |

The data show that the melt flow of the PPS had dropped from the initial value of 6500 to 138 as a result of the curing process.

In a comparison run the curing vessel was filled with about 525 lbs. of the same lot of uncured resin used before and the resin was cured to a melt flow of 117 by stirring the resin at the same rate and same air flow as before. A curing bed temperature ranging from about 180° to about 235° C. was employed, mostly ranging from 215° to 234° C. The curing time employed was 27.75 hours. The cooling time was 2.5 hours as in the inventive run. This gives a total time in the curing vessel of 30.25 hours. The higher temperature and shorter time of the comparison run balance the relatively lower temperature and longer time of the invention run.

Samples of the resins cured by each method were compounded with identical amounts of mineral fillers and glass fibers such as described in U.S. Pat. No. 4,134,874 which issued Jan. 16, 1979 to D. G. Needham. Injection molded specimens were prepared from each compounded sample and the physical properties determined as shown in the reference. The results are given in Table 2.

TABLE 2

Comparison of Compounded, Molded Cured Samples

| Curing Process | Melt Flow g/10 min | Flexural Modulus GPa (psi) | Flexural Strength MPa (psi) | Tensile Strength MPa (psi) | Izod Impact Strength J/m (ft. lb/in) | | Heat Distortion | |
|---|---|---|---|---|---|---|---|---|
| | | | | | Notched | UnNotched | °C. | (°F.) |
| Polisher-Curing Vessel | 75 | 13.97 (2.03 × 10$^6$) | 206 | 132 (19,200) | 71.8 (1.35) | 327 (6.12) | 257 | (495) |
| Curing Vessel | 31 | 14.22 (2.06 × 10$^6$) | 193 | 134 (19,400) | 73.4 (1.38) | 367 (6.87) | 259 | (498) |

The compounded samples are similar in physical properties as the results above show. The differences shown are minor in nature and can be attributed mainly to probably minor variations in sample composition. Either sample falls within the specification values for compositions suitable for the same end use application, e.g. electrical components.

EXAMPLE 2

This is a calculated example based upon the polisher data obtained in the first example and a knowledge of a commercially operated batch curing process. In Example 1, the average feed temperature was about 35° C. (95° F.), the average bed discharge temperature of the preheated resin was about 202° C. (395° F.), and about 21 kilowatts (kWh) were consumed in driving the rotor. The energy input to the polymer is calculated as:

$$\frac{(21 \text{ kW}) (3413 \text{ BTu/hr/kW})}{(420 \text{ lb/hr}) (395° \text{ F.}-95° \text{ F.})} = 0.57 \text{ BTu/lb °F.}$$

In the calculated example, a polisher employing a 250 hp motor to drive the rotor is used. With an energy input to the polymer of 0.57 BTu/lb °F. as above the unit provides about 4000 lbs/hr (1820 kg/hr) of preheated resin. The curing vessel employed has a capacity of 16,000 lbs (9260 kg). It requires 18 hours to heat a batch of resin from ambient temperature, 27° C. (80° F.), to curing bed temperature, 420° F. (216° C.) in the vessel initially at about 55° C. (130° F.) and brought to the curing temperature during the filling process. Resin in the vessel is constantly stirred with a double spiral agitator rotating at 30 RPM while air was introduced in the vessel ends at about 0.2 SCFM. Associated equipment is provided to maintain the processing conditions associated with heat up, run conditions, and cool down. It requires 4 hours to charge the vessel, 18 hours to reach curing temperature, 26 hours at curing temperature to reach the desired melt flow value, 8 hours to cool down to dumping temperature 55° C. (130° F.) to reach the desired melt flow value, and 4 hours to dump the cured resin into receptacles for storage.

The initial melt flow of the uncured resin is 6400 and the average melt flow of the final cured resin is 125. The length of the curing cycle is 60 hours. The number of batches per year with a 60 hour cycle can be 146 which amounts to 146×16,000 lbs resin=2,336,000 lbs (1,060,000 kg) of cured resin prepared per year by employing only a curing vessel.

In the invention process, uncured resin having a melt flow of 6500 and at a temperature of 80° F. is processed through the polisher at 4,000 lbs/hr, reaching a bed temperature of 380° F. (193° C.) and charged to the curing vessel already heated to about 130° F. It takes 4 hours to fill the vessel while it and the accumulating charge is heated to 420° F., the total time requiring 4 more hours. After that the curing takes place exactly as described in the control run. The average melt flow of the product is 125 as before. The length of the curing cycle is 42 hours. The number of batches per year in this process can be 208 which allows 208×16,000 lb resin-3,328,000 lbs (1,510,000 kg) of cured resin to be produced by employing preheated resin. Thus, 992,000 lbs (450,000 kg) of additional polymer can be prepared per year by practicing the invention.

I claim:

1. A method for curing particulate arylene sulfide polymer comprising:
   (a) preheating said particulate polymer from ambient temperature to a skin temperature within a range of about 230° to about 260° C. utilizing the frictional heat developed by the agitation of the particulate polymer in a polisher apparatus,
   (b) transferring said preheated particles to a curing vessel, and
   (c) further heating said preheated particulate polymers for a time and at a bed temperature to produce cured polymer having a pre-selected melt flow range lower than the melt flow range of the polymer prior to curing.

2. A method of claim 1 wherein the bed temperature attained in said curing vessel is in a range of about 10° to about 100° C. below the melting point of the polymer.

3. A method of claim 2 wherein said bed temperature is within the range of about 180° to about 280° C.

4. A method of claim 2 or 3 wherein the time of cure within the curing vessel ranges from about 1 minute to about 24 hours.

5. A method of claim 1 wherein said preheating is carried out continuously with the heated polymer delivered to alternative curing vessels wherein the curing is carried out batch wise.

6. A method of claim 1 further comprising cooling to ambient temperature said cured polymer having a pre-selected melt flow and discharging the cured polymer from the curing vessel.

* * * * *